J. A. Braden,
Scissors and Shears.
№ 21,546.          Patented Sep. 21, 1858.
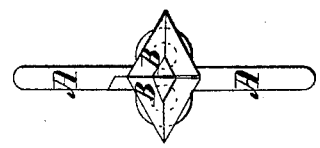
Fig: 3.
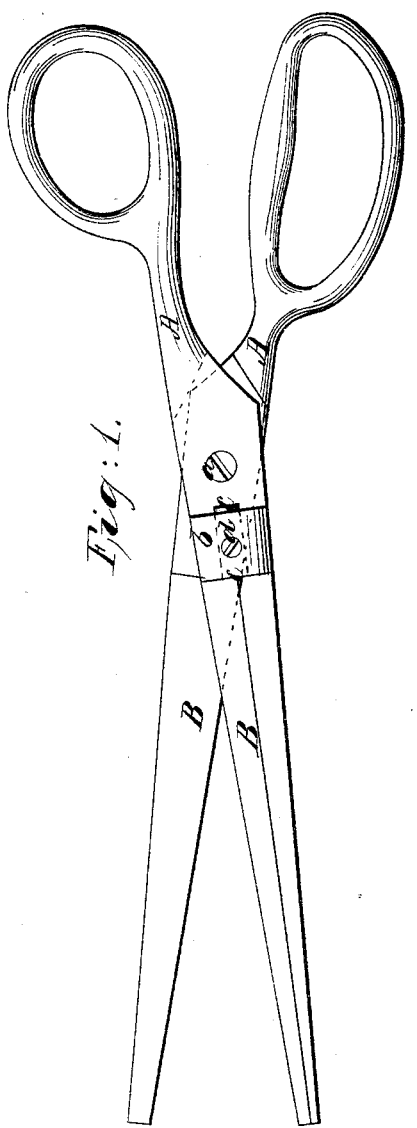
Fig: 1.
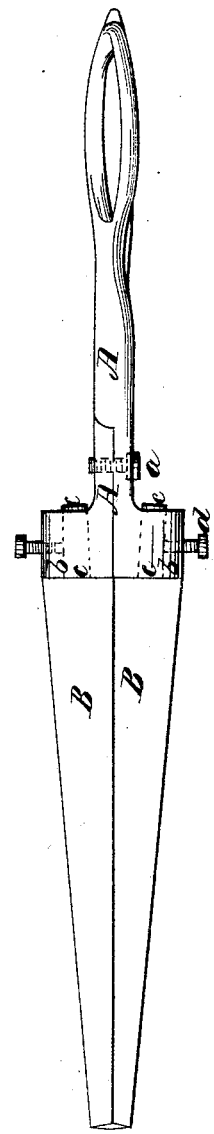
Fig: 2.

UNITED STATES PATENT OFFICE.

JOSEPH A. BRADEN, OF LAGRANGE, GEORGIA.

SHEARS.

Specification forming part of Letters Patent No. 21,546, dated September 21, 1858; Reissued December 28, 1858, No. 638.

*To all whom it may concern:*

Be it known that I, JOSEPH A. BRADEN, of Lagrange, in the county of Troup and State of Georgia, have invented a new and useful Improvement in Scissors and Shears; and I do hereby declare that the following is a full, clear, and exact description of the same, reference being had to the accompanying drawings, making part of this specification, in which—

Figure 1 is a side view of a pair of shears constructed according to my invention. Fig. 2 is a top view of the same. Fig. 3 is a view looking directly toward the points of the same.

Similar letters of reference denote like parts in all the figures.

This invention consists in making the blades of scissors or shears with their transverse sections of the form of equilateral triangles, so that each presents three cutting edges, and fitting them to the handles in such a manner that they are capable of being turned therein when desired to bring a new pair of cutting edges into an operative position when one pair has been worn out or blunted.

To enable others to make and apply my invention to use, I will proceed to describe it by the aid of the drawings.

A, A, are the handles of the shears made and fitted together in the usual form, and connected by the usual rivet, screw or pin $a$, beyond which they are extended but a short distance. The parts $b$, $b$, extended beyond the pin $a$, are made in the form of sockets to receive the triangular blades B, B, which may be made with their sides parallel longitudinally, $i$, $e$, of the form of prisms, or taper with straight sides; in either case having all their edges or angles sharp. The blades in the example of my invention represented in the drawing are made taper and furnished with round stems $c$, $c$, to fit to the sockets $b$, $b$, the centers of said stems being in line with the centers of the blades, and the sockets $b$, $b$, having such a position and direction that any two sides of the two blades being brought opposite each other, they will fit close together throughout the whole length, and thus present a pair of cutting edges in an operative position. The stems $c$, $c$, of the blades are secured by set screws $d$, $d$, when the blades are adjusted, and by slackening these screws and opening the shears wide enough for the blades B, B, to be clear of each other, the blades are permitted to be turned to bring a new pair of edges into an operative condition, in which condition they may be secured by tightening up the set screws. It will be readily understood that the taper blades represented are capable of presenting three separate pairs of cutting edges; but if the blades are made of prismatic form, $i$, $e$., with their sides parallel longitudinally, they may, after having three pairs of cutting edges blunted in one way, have the positions of the blades reversed, that is to say, have their other ends inserted in the sockets, and so present three other pairs of cutting edges in a very slightly injured condition.

What I claim as my invention, and desire to secure by Letters Patent, is:—

Making the blades of triangular form in their transverse sections, and fitting them to the handles so as to be capable of being turned therein to present three different pairs of edges in an operative position, substantially as herein described.

JOSEPH A. BRADEN.

Witnesses:
 O. S. MAFFITT,
 H. O. STANLEY.

[FIRST PRINTED 1911.]